United States Patent
Kamezaki et al.

(10) Patent No.: US 6,982,110 B2
(45) Date of Patent: Jan. 3, 2006

(54) INFORMATION RECORDING MEDIUM AND MANUFACTURING METHOD THEREOF

(75) Inventors: Hisamitsu Kamezaki, Kanagawa (JP); Yasuo Sawada, Tokyo (JP); Yasuhide Fujiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 567 days.

(21) Appl. No.: 10/155,491

(22) Filed: May 23, 2002

(65) Prior Publication Data

US 2003/0007448 A1   Jan. 9, 2003

(30) Foreign Application Priority Data

May 25, 2001  (JP)  ............................. 2001-157431
Jun. 27, 2001 (JP)  ............................. 2001-195243

(51) Int. Cl.
  *B32B 3/02*  (2006.01)
(52) U.S. Cl. ................... 428/64.1; 428/64.4; 428/64.5; 430/270.12; 430/270.13
(58) Field of Classification Search ............. 428/64.1, 428/64.4, 64.5, 64.8; 430/270.12, 270.13; 369/275.2, 275.4
See application file for complete search history.

(56) References Cited

U.S. PATENT DOCUMENTS

| 5,316,814 A | * | 5/1994 | Sawada et al. ............ 428/64.8 |
| 5,321,673 A |   | 6/1994 | Okazaki |
| 5,696,758 A | * | 12/1997 | Yanagimachi et al. ... 369/275.4 |
| 5,904,969 A | * | 5/1999 | Kamezaki et al. ......... 428/64.1 |
| 6,137,769 A |   | 10/2000 | Sawada et al. |
| 6,169,721 B1 |  | 1/2001 | Takishita et al. |
| 6,212,158 B1 | * | 4/2001 | Ha et al. .................. 369/275.4 |
| 6,580,678 B2 | * | 6/2003 | Kondo et al. ............ 369/275.2 |
| 6,667,948 B2 | * | 12/2003 | Chen et al. .............. 369/275.2 |
| 6,671,249 B2 | * | 12/2003 | Horie ....................... 369/275.3 |
| 6,724,717 B2 | * | 4/2004 | Noda .......................... 369/277 |

FOREIGN PATENT DOCUMENTS

| EP | 0762392 A2 | 3/1997 |
| JP | 3241538 | 10/1991 |
| JP | 4146536 | 5/1992 |
| JP | 4146537 | 5/1992 |
| JP | 7114028 | 12/1995 |
| JP | 8-27992 | 3/1996 |
| JP | 2596474 | 1/1997 |
| JP | 2596476 | 1/1997 |
| JP | 2596477 | 1/1997 |
| JP | 2597491 | 1/1997 |

* cited by examiner

*Primary Examiner*—Elizabeth Mulvaney
(74) *Attorney, Agent, or Firm*—Cooper & Dunham LLP (57) ABSTRACT

An information recording medium includes a transparent substrate and a recording layer or a metal layer provided on the transparent substrate directly or via a ground layer. The information recording medium has a RAM area on which information is recorded, reproduced or erased, and a ROM area from which only reproduction is made, and an average thickness of the recording layer of said RAM area is larger than that of the recording layer or metal layer of the ROM area.

13 Claims, 8 Drawing Sheets

INFORMATION RECORDING MEDIUM AND MANUFACTURING METHOD THEREOF

BACKGROUND OF THE INVENTION

1. Field of the Invention

The present invention relates to an optical information recording medium on which recording/reproducing of information is made by means of laser beam application, and, in particular, to an optical information recording medium having therein both a RAM area on which information recording, reproducing and erasing can be made and a ROM area from which only information reading can be made (such a type of an optical information recording medium will be referred to as a 'hybrid optical information recording medium', hereinafter).

2. Description of the Related Art

Japanese patent registrations Nos. 2596474, 2596477, 2597491, Japanese laid-open patent applications Nos. 4-146537, 4-146536 and 3-241538 disclose such a type of hybrid optical information recording medium, for example.

In case of manufacturing such a type of hybrid optical information recording medium utilizing organic pigment as in well-known CD-R, DVD-R, and so forth, when pre-pits in the ROM area are filled up with a pigment material, there has been no reference value in amount of pigment material to be used therefor. However, in case of the amount of pigment material is too much, various problems such as that in which the modulation degree becomes lowered, symmetry becomes degraded, and so forth, may occur in the resulting product of the recording medium.

SUMMARY OF THE INVENTION

According to the present invention, in order to solve this problem, a hybrid optical information recording medium is provided in which the modulation degree is high, and also, the symmetry is prevented from being degraded as the absorbance on the RAM area is made higher than that on the ROM area.

An information recording medium according to the present invention includes:

a transparent substrate; and a recording layer or a metal layer provided on said transparent substrate directly or via a ground layer, wherein:

said information recording medium has a RAM area on which information is recorded, reproduced or erased, and a ROM area from which only reproduction is made; and an average thickness of the recording layer of said RAM area is larger than that of the recording layer or metal layer of the ROM area.

Thereby, it is possible to achieve the information recording medium in which the pigment material is filled with appropriately by a proper amount.

The average thickness of the recording layer can be made to have a predetermined value by measuring the absorbance of the recording layer or metal layer. Thus, it is possible to control the film thickness by a simple and easier way.

The recording layer is preferably made of a pigment material. Thereby, it is easy to measure the film thickness by measuring the absorbance.

The absorbance of the pigment film on the RAM area is preferably higher than that on the ROM area at a wavelength λmax. The wavelength λmax means the wavelength at which the absorbance becomes maximum, hereinafter. Thereby, the RAM area is made to have a large film thickness while the pre-pits is made to be filled with a small amount of pigment filled therein, and, thus a satisfactory reproduction signal can be obtained therefrom.

The RAM area and ROM area preferably include the recording layer or metal layer of the same material. Thereby, the absorbance spectrum can be made to have a same shape between the RAM area and ROM area.

The absorbance on the RAM area is preferably higher than that on the ROM area at a wavelength employed in information recording/reproducing process. Thereby, the ROM area is made to have a small average film thickness, and, thus, the pre-pits is made to be filled with a small amount of pigment filled therein, and, thus a satisfactory reproduction signal can be obtained therefrom.

The following requirement is preferably satisfied:

$$1 \leq ABSram/ABSrom \leq 1.3$$

where:

ABSram denotes the absorbance on the RAM area; and
ABSrom denotes the absorbance on the ROM area.

Thereby, a satisfactory reproduction signal can be obtained therefrom.

A method of manufacturing an information recording medium according to the present invention includes the steps of:

a) measuring the absorbance of a recording layer or metal layer with respect to the average thickness thereof; and b) forming the recording layer or metal layer to have a predetermined average thickness by using the measurement result obtained by said step a).

Thereby, it is possible to measure the film thickness by an easier way and thus to control the film thickness by a simple manner.

BRIEF DESCRIPTION OF DRAWINGS

Other objects and further features of the present invention will become more apparent from the following detailed description when read in conjunction with the accompanying drawings.

DETAILED DESCRIPTION OF THE PREFERRED EMBODIMENTS

Figure 1:
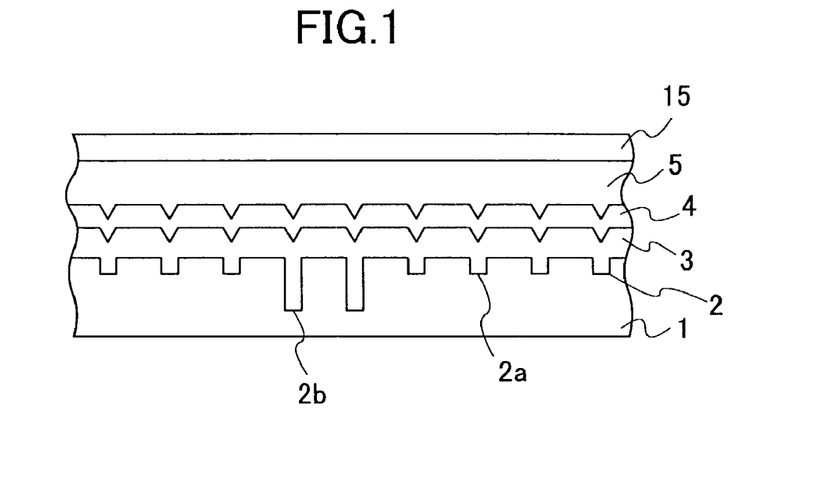
FIG. 1 shows a magnified partial side-elevational sectional view of an optical information recording medium in each of first, second and third embodiments of the present invention.
Figure 2:
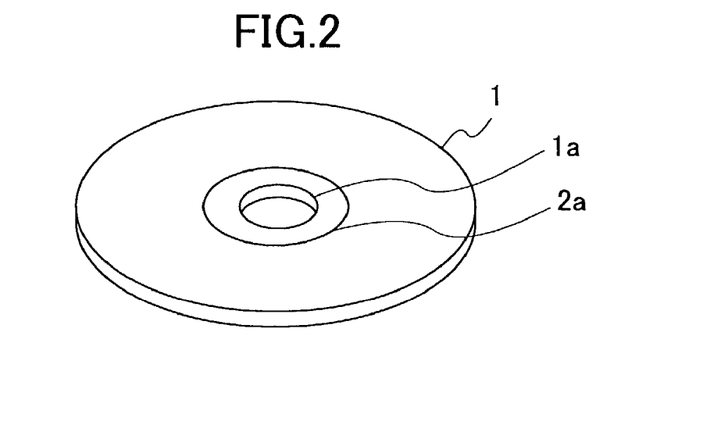
FIG. 2 shows a perspective view of the optical information recording medium shown in FIG. 1.

FIG. 1 shows a magnified side elevational sectional view of an optical information recording medium in each of first, second and third embodiments of the present invention, and FIG. 2 shows a perspective view thereof.

As shown in FIG. 1, the information recording medium (referred to as an optical disk, hereinafter) includes a transparent substrate 1 in which a preformat pattern 2 having a shape of fine three-dimensional profile is formed on one side; an information recording part 3 formed as a result of a heat-mode recording material being applied on the transparent substrate 1 which contains at least a material which absorbs an optical energy into the preformat pattern 2, and changes the optical energy into a thermal energy, or such a type of pigment material; a metal film 4 coated on the information recording part 3; and a protective layer 5 coated on the metal film 4.

As the transparent substrate 1, a well-known transparent substrate may be applied, for example, one obtained as a result of forming into a predetermined shape a transparent resin material such as polycarbonate, polymethylmethacrylate, polymethylpentene, epoxy, or the like, and, then, transferring a predetermined preformat pattern into one side thereof, one obtained as a result of causing a transparent resin layer having a predetermined preformat pattern transferred onto one side thereof to adhere to one side of a transparent ceramic plate such as a glass formed into a predetermined shape, or the like. As shown in FIG. 2, the transparent substrate 1 of the optical disk has a shape of a disk having a center hole 1a formed at the center thereof.

The preformat pattern 2 includes at least a beam guidance part used for causing a laser beam for recording/reproducing to follow a recording track provided on the optical disk. The beam guidance part includes a guidance groove 2a spiral or concentric with respect to the center of the center hole 1a as shown in FIG. 2. Along the guidance groove 2a, prepits 2b such as address pits, clock pits and so forth are formed (see FIG. 1). In case where the prepits 2b are formed in an overlapping manner with respect to the guidance groove 2a, the depths are made different therebetween as shown in FIG. 1. In case where each pepit 2b is formed between adjacent guidance grooves 2a, they may have the same depths.

Instead of the beam guidance groove 2a, a wobble pit may be formed along the recording track as the beam guidance part.

As mentioned above, the information recording part 3 is made of a heat-mode material containing at least as a part a material absorbing an optical energy and transforming it into a heat energy, or such a type of ionic pigment material with which the preformat pattern 2 is filled.

As the pigment material which forms the information recording part 3, polymethine pigment, anthraquinone pigment, cyanine pigment, phthalocyanine pigment, naphthalocyanine pigment, xanthene pigment, triphenylmethane pigment, pyrylium pigment, azulene pigment, metal-contain azo dye, azo dye, etc. can be applied, for example. Thereamong, dicarbocyanine derivative, phthalocyanine derivative, naphthalocyanine derivative, cyanine derivative, and azo-dye derivative may be applied more preferably. Moreover, a pigment material to which various quenchers such as aluminum pigment may also be applied to this purpose.

Furthermore, it is also possible to use a matter obtained from dispersing one or a plurality of types of pigment materials selected from the above-mentioned pigment materials into a resin, as a material forming the information recording part 3. As the resin material into which the pigment materials are dispersed, acrylic resin, vinyl resin, phenol resin, fluororesin, silicone resin, polyamide resin, cellulose resin etc. may be applied.

The information recording part 3 is formed through a spin-coating process performed on the surface of the transparent substrate 1 on which the preformat pattern 2 is formed with the pigment materials mentioned above or the like. Further, after filling the groove-shaped preformat pattern 2 with the pigment materials, the pigment materials adhering to the land parts present between the groove parts of the preformat pattern 2 are selectively removed and thus the surface of the transparent substrate 1 is exposed there. Alternatively, it is also possible to fill only the groove parts of the preformat pattern 2 with the pigment materials. As the solvent for the pigment materials, alcohol solvent, cellosolve solvent or the like may be used.

Furthermore, it is also possible to obtain the information recording part 3, by containing the following chelate materials which can take a bidentate ligand. For example, inorganic acids, dicarboxilic acids, oxycarboxylic acids, dioxy compounds, oxyoxims, oxyaldehydes and derivatives, diketones and similar compounds, oxyquinones, tropolones, N-oxide compounds, aminocarboxylic acids and similar compounds, hydroxyl amines, oxines, aldimines, oxyoxims, oxyazo compounds, nitrosonaphthols, triazenes, bullets, formazanes and dithizones, biguanides, glyoxime, diamines and similar compounds, hydradyne compounds, thioethers etc. may be used. Furthermore, a derivative having an imino group (imide, amide) may also be used.

Furthermore, other than the above-mentioned organic materials, a phase-change material on which information recording is made through a change in atomic arrangement may also be applied. Specifically, amorphous metal represented by 'A'-'B'-'C'-Ge—Te, and an alloy may be used. There, 'A' denotes at least one-element of Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, S, Se, lanthanide element, actinide element, alkaline earth metal element, inactive gas element, etc. 'B' denotes at least one element of a halogen element such as Tl, I, or the like, and an alkaline metal element, such as Na or the like. 'C' denotes at least one element of Sb, Sn, As, Pb, Bi, Zn, Cd, Si, Al, Ga, and In.

Furthermore, a metal material applied as a magneto-optical material, i.e., the above-mentioned metal elements such as Tb, Fe, Co and so forth may be applied as the information recording part 3 (recording layer).

Although no specific limitation is made on the metal layer 4, a metal material such as aminium, silver, copper or the like, or alloy materials containing them as main ingredients may be applied. Especially, it is preferable to use a metal or an alloy containing silver as a main ingredient. The alloy containing silver as a main ingredient means an alloy containing silver by a content in the range between 80 and 100 atomic %, more preferably, in the range between 90 and 100 atomic %.

Moreover, among these reflective layer (metal layer) materials, aminium is preferably used as it is not expensive, and also, it has been actually used in compact disks in the market. In case a metal material or an alloy material is applied as the metal layer material, the metal layer 4 is formed through a vacuum film formation method such as sputtering, vacuum evaporation, or the like. In this case, it is possible to apply a technique of improving the reflectance of this metal reflecting film by combining films having different concentrations or different crystallized states by changing the vacuum degree (for example, $10^{-5}$ torrs) in the sputtering in the vacuum chamber.

The protective layer 5 can be formed using an inorganic material such as SiO, SiN, AlN or the like, or an organic material, such as photosetting resin or the like. The inorganic protective layer may be formed by applying a vacuum film formation method, while the organic protective layer may be formed by applying resin setting light after forming a photosetting resin film (for example, SD1700, SD318, or SD301 made by Dainippon Ink & Chemicals, Inc.) on the metal layer 4 through spin coating technique.

Specific embodiments of the present invention will now be described.

A first embodiment will now be described.

The information recording part 3 is formed by carrying out a spin-coating process of phthalocyanine solution onto a polycarbonate substrate which has the preformat pattern shown in FIGS. 1 and 2. A metal film having a thickness of 100 nm is formed by a sputtering process on this information recording part 3, and thus, the metal layer 4 is formed. Then, on the metal layer 4, SD1700 (having the heat conductivity not more than 1.0) of Dainippon Ink & Chemicals, Inc. is laminated, and, thus, the protective layer 5 having the film thickness of 5 μm is formed. Furthermore, an ink layer 15 of UV setting property is formed on the protective layer 5. Specifically, 0.67 g of DICUV ink (Dainippon Ink & Chemicals, Inc.) is laminated there.

Figure 3:
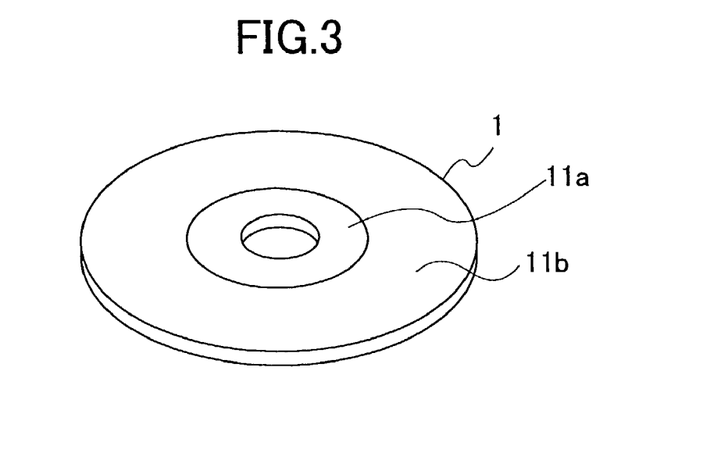
FIG. 3 shows another perspective view of the optical information recording medium shown in FIG. 1.

Moreover, as shown in FIG. 3, the optical information recording medium according to the first embodiment has such a configuration that an information recording area of the disk is divided into a ROM area 11a and a RAM area (write-once area) 11b, i.e., this embodiment is of a so-called partial ROM type optical information recording medium.

In the above-mentioned ROM area 11a, the beam guidance part, header part, groove part, read-only information signal part, and pit part are formed as the preformat pattern 2 according to the necessity. On the other hand, in the RAM area 11b, as the preformat pattern 2, the beam guidance part, header part, not-yet recorded part arranged with uniform intervals between the header part on the track, and groove part are arranged according to the necessity. Thus, an information write-once area is provided.

By changing the condition in the spin-coating process, the absorbance on the same pigment material was made to differ between the RAM area and ROM area. Signal characteristics on these recording areas are those shown in the following table 1. The absorbance here means an absorbance of the pigment at λmax after the film formation process.

TABLE 1

| Absorbance | | | ROM area asymmetry | ROM area Modulation |
|---|---|---|---|---|
| RAM area | ROM area | ABSram/ABSrom | (±20% ≧) | (60% ≦) |
| 1.51 | 1.16 | 1.30 | −5% | 75% |
| 1.51 | 1.51 | 1.00 | 4% | 70% |
| 1.51 | 1.964 | 0.77 | 22% | 40% |

As can be seen from the table 1, the best signal characteristics can be obtained in case the relationship between the absorbance on the RAM area (ABSram) and absorbance on the ROM area (ABSrom) satisfies the following requirement:

$$1 \leq ABSram/ABSrom \leq 1.3$$

Further, it is also possible to obtain a similar relationship on transmittance of the pigment material as the transmittance T and the absorbance A have the following relationship:

$$Log_{10}(100/T)=A$$

Accordingly, it is also possible to provide the definition on the requirements by the transmittance, similarly.

A second embodiment of the present invention will now be described.

The second embodiment is same the above-described first embodiment except that the RAM area and ROM area are formed by different pigment materials. On the respective pigment materials, as experiment, average film thickness is calculated from measurement values of the absorbance and the molar absorption coefficients on the pigment materials. Also in this case, the absorbance means an absorbance of the relevant pigment material at a wavelength λmax.

As a result of this experiment, it has been found out that a satisfactory reproduction signal can be obtained from a recording medium according to the second embodiment in case where the average film thickness of the information recording part 3 (recording layer) on the RAM area is larger than the same on the ROM area. This is because the prepits on the ROM area has the depth smaller than the depth of the guidance groove on the RAM area, and thus, the smaller amount of pigment is applied to the prepits.

A third embodiment of the present invention will now be descried. The third embodiment is same the above-described first embodiment except that the RAM area and ROM area are formed by same metal materials. Then, as an experiment, absorbance was measured at wavelengths used for recording/reproducing process. As a result, it has been found out that, same as in the above-mentioned first embodiment, a satisfactorily signal is obtained in the range of relationship formula same as that in the case of the first embodiment in case the absorbance is higher on the RAM area than on the ROM area.

Figure 4:
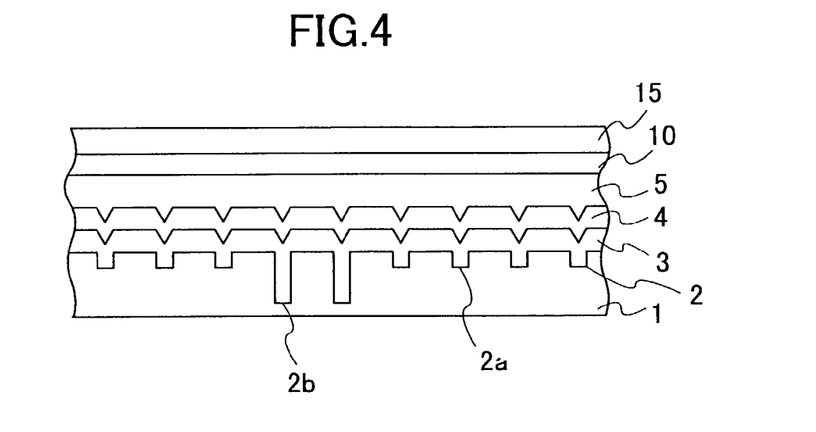
FIG. 4 shows a magnified partial side-elevational sectional view of an optical information recording medium in a fourth embodiment of the present invention.

A fourth embodiment of the present invention will now be described. An optical information recording medium according to the fourth embodiment will now be described with reference to FIG. 4. FIG. 4 shows a magnified side-elevational sectional view of an essential part of the optical information recording medium according to the fourth embodiment. As can be seen from the figure, this optical information recording medium is the same as that in the first embodiment described above, except that a layer 15 containing a hydrophilic material laminated on the UV setting ink.

As this hydrophilic material, polyvinyl-pyrolidone, polyvinyl-alcohol, extender or the like may be applied. Furthermore, the UV setting ink layer and the layer containing the hydrophilic material may be coated onto a so-called disk cramping area of the optical disk alone or in a combination thereof, at which cramping area, the disk is cramped onto a turn table of a disk drive.

Figure 5:
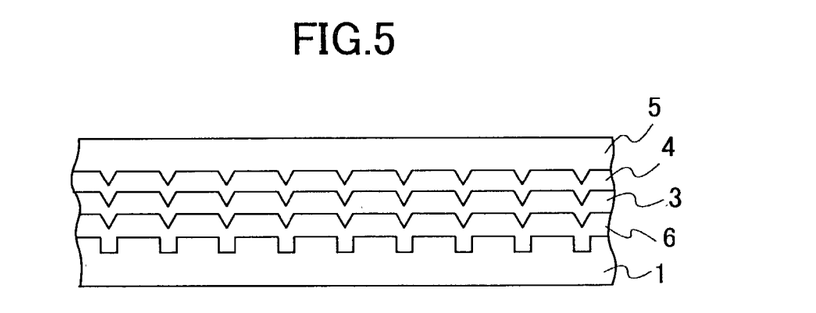
FIG. 5 shows a magnified partial side-elevational sectional view of an optical information recording medium in a fifth embodiment of the present invention.

A fifth embodiment of the present invention will now be described. An optical information recording medium according to the fifth embodiment will now be described with reference to FIG. 5. FIG. 5 shows a magnified side-elevational sectional view of an essential part of the optical information recording medium according to the fifth embodiment. As can be seen from the figure, in this optical information recording medium, a ground layer 6 is formed on the preformat-pattern-formed side of the transparent substrate 1, the pigment material is used to fill grooves with formed on the ground layer 6 corresponding to the preformat pattern 2, and, thus, the information recording part 3 is formed.

The ground layer 6 is provided for the purpose of improvement of the adhesion performance between the transparent substrate 1 and the information recording part 3, improvement of recording sensitivity of the recording medium, also protection of the information recording part 3 etc., and is formed of a hydrophilic resin, such as polyvinyl alcohol, polyethylene oxide, polyacrylic acid, polystyrene sodium-sulphonate, polyvinyl pyrolidone, polymethacrylic acid, polypropylene glycol, methyl-cellulose, polyvinyl-nitrate, nitro-cellulose, or the like. Formation of the ground layer 6 may be made by carrying out a spin-coating process with a solution of the hydrophilic resin to the preformat pattern 2 formation side of the transparent substrate 1.

Since the ground layer 6 is made of the hydrophilic resin, water resistance (moisture resistance, permeability) performance and also its heat resistance performance may become problematic. Therefore, it is preferable to perform crosslinking treatment or crystallization treatment on the ground layer 6 so as improve the water resistance performance and heat resistance performance. Specifically, after making film formation of the ground layer 6 by adding a crosslinking agent into the solution of the hydrophilic resin, crosslinking reaction is made to occur by irradiation or by heating. Alternatively, the ground layer 6 having no crosslinking agent added thereto is crystallized through a heat process (for example, in using polyvinyl alcohol (PVA) as the hydrophilic resin, PVA is transformed into denatured PVA thereby).

When the crosslinking processing is compared with the crystallization processing, since it does not have a bad influence due to heating on the transparent substrate 1 and also excels in workability, the crosslinking processing is more preferable than the crystallization processing.

Below, examples of the crosslinking reaction will be described. On an actual occasion of realization of the embodiment, an arbitrary example may be employed from among these crosslinking reactions appropriately.

(1) A method where ammonium dichromate is added to the pigment surface as the crosslinking agent, and, also, a reaction light is applied to the thus-formed film. Thus, crosslinking reaction is made to occur in the ground layer 6;

(2) A method in which copper, boron, aluminum, titanium, zirconium, tin, vanadium, chromium, or the like is added as the inorganic crosslinking agent;

(3) A method in which aldehyde is used and the ground layer is transformed into acetal;

(4) A method in which a hydroxyl group is transformed into aldehyde;.

(5) A method in which an activation vinyl compound is added;

(6) A method in which an epoxy compound is added and the ground layer is transformed into ether;

(7) A method in which dicarboxylic acid reaction is made to occur in the presence of an acid catalyst;

(8) A method in which succinic acid and sulfuric acid are added;

(9) A method in which triethylene glycol and methyl acrylate are added; and (10) A method in which polyacrylic acid and methylvinylether-maleic-acid copolymer are blended.

As to the other transparent substrate 1, information recording part 3, reflective layer 4, and protective layer 5, since they are the same as those in the above-described first embodiment, duplicated description thereof is omitted.

A further specific embodiment (sixth embodiment) will now be described. There, polyvinyl alcohol is chosen as the ground layer material. 2.0 wt % solution thereof is used for forming a film through a spin coating process, and chromium is used as the crosslinking material for stabilizing thereof. As to the transparent substrate 1, information recording part 3, reflective layer 4, protective layer 5, and UV setting ink layer 10, since they are the same as those in the above-described first embodiment, the duplicated description thereof is omitted.

Figure 6:
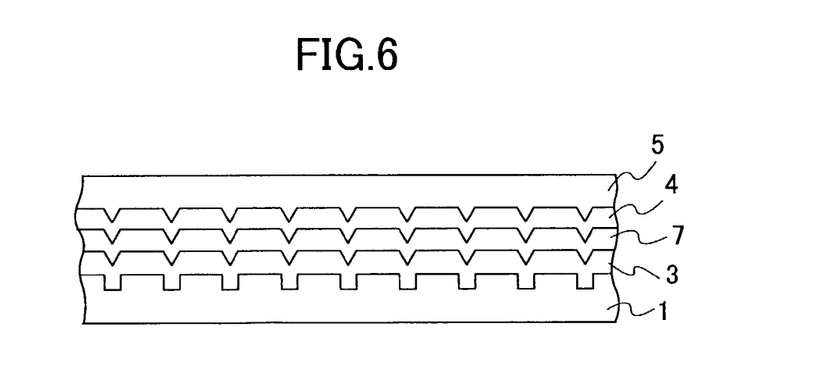
FIG. 6 shows a magnified partial side-elevational sectional view of an optical information recording medium in a sixth embodiment of the present invention.

The optical information recording medium according to this sixth embodiment will now be described with reference to FIG. 6. FIG. 6 shows a magnified side-elevational sectional view of an essential part of the optical information recording medium according to the sixth embodiment. As can be seen from the figure, in this optical information recording medium, the reflective layer 4 is laminated, via an intermediate layer 7, on the information recording part 3 formed through filling up with the pigment into the preformat pattern 2, and also, the protective layer 5 is coated so that these intermediate layer 7 and reflective layer 4 are covered thereby.

The intermediate layer 7 is formed for the purpose of improvement of the adhesion performance between the information recording part 3 and the reflective layer 4, improvement in the record sensitivity, and also for the purpose of protection of the information recording part 3 etc., and may contain a hydrophilic resin in the same type as in the ground layer 6 in the above-mentioned second embodiment, or a material having electron donor or acceptor property corresponding to the oxidation-reduction reaction of the metal film, which the information recording part 3 in the first embodiment may also contain.

When the hydrophilic resin is chosen as the material of the intermediate layer 7, the layer may be obtained through a spin-coating process of a solution thereof onto the information recording part 3. Also concerning the intermediate layer 7, in order to improve water resistance and heat resistance performance, it is preferably to perform crosslinking processing or crystallization processing to the intermediate layer 7 formed through the spin-coating process. Specific ways of the crosslinking processing and crystallization processing may be the same described in the description of the second embodiment above.

As to the transparent substrate 1, information recording part 3, reflective layer 4, protective layer 5, and UV-setting ink layer 10, since they are the same as those in the above-described first embodiment, the duplicated description thereof is omitted.

Figure 7:
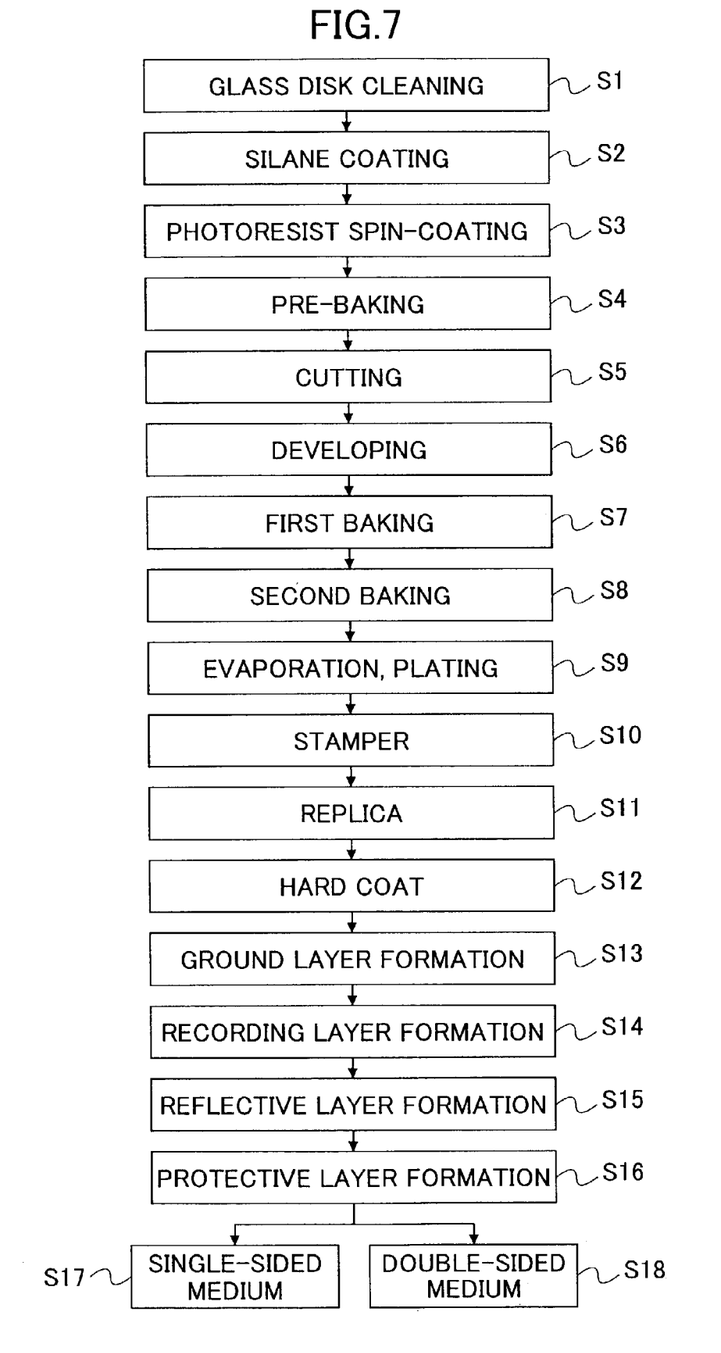
FIG. 7 shows a flow chart of a method for manufacturing an optical information recording medium according to any of the first through sixth embodiments of the present invention.

FIG. 7 shows a flow chart of manufacturing process of the optical disk according to the sixth embodiment. As shown in the figure, in a step S1, a glass disk is ground and washed. Subsequently, silane is coated thereon in a step S2, then, spin coating of photoresist is performed on the glass disk in a step S3, and thereby, a resist layer having a predetermined film thickness is formed. Furthermore, in order to remove the solvent, pre-baking is performed in a step S4, and then, a laser beam is made to be applied on the resist layer (cutting) through a condensation lens in a step S5. After that, in a step S6, the thus-exposed glass disk is made to undergo development processing in a step S6, the resist is heated above the temperature Tg in a step S7, and thus, grooves are formed thereon (first baking).

After that, baking for fixing the pattern is performed in a step S8 (second baking), then, in a step S9, vacuum evaporation and plating are performed, then, a metal film is formed on the uneven surface of the glass disk in a step S10, and then a stamper is produced as a result of the thus-formed metal film being removed.

In a step S11, injection mold is performed by using the thus-obtained stamper, and a replica layer which has a predetermined thickness is formed. Subsequently, a hard coat layer is formed on one side of the transparent substrate by a spin-coating process in a step S12. Furthermore, the ground layer is formed in one side of the thus-produced transparent substrate by the spin coating method by S13. In a step S14, the recording layer (information recording part) is formed on the upper surface of the ground layer by a spin-coating process. The reflective layer is then formed on the recording layer in a step S15. Furthermore, a thin layer is formed on the top surface of the recording layer by a spin-coating process in a step S16. Then, the thus-produced recording medium is used as a single-sided medium in a step S17, or the thus-produced two recording media (original and replica) are used as a double-sided medium in a step S18. Subsequently, the single-sided medium or double-sided medium thus obtained is put into a disk cartridge, and the characteristics thereof is evaluated.

In this flow chart, the steps S7 and S8 may be performed simultaneously. For the purpose of forming the shape of grooves, the heating temperature should be in the range between 90° and 180°, and the heating time period should be in the range between 5 and 90 minutes.

Figure 8:
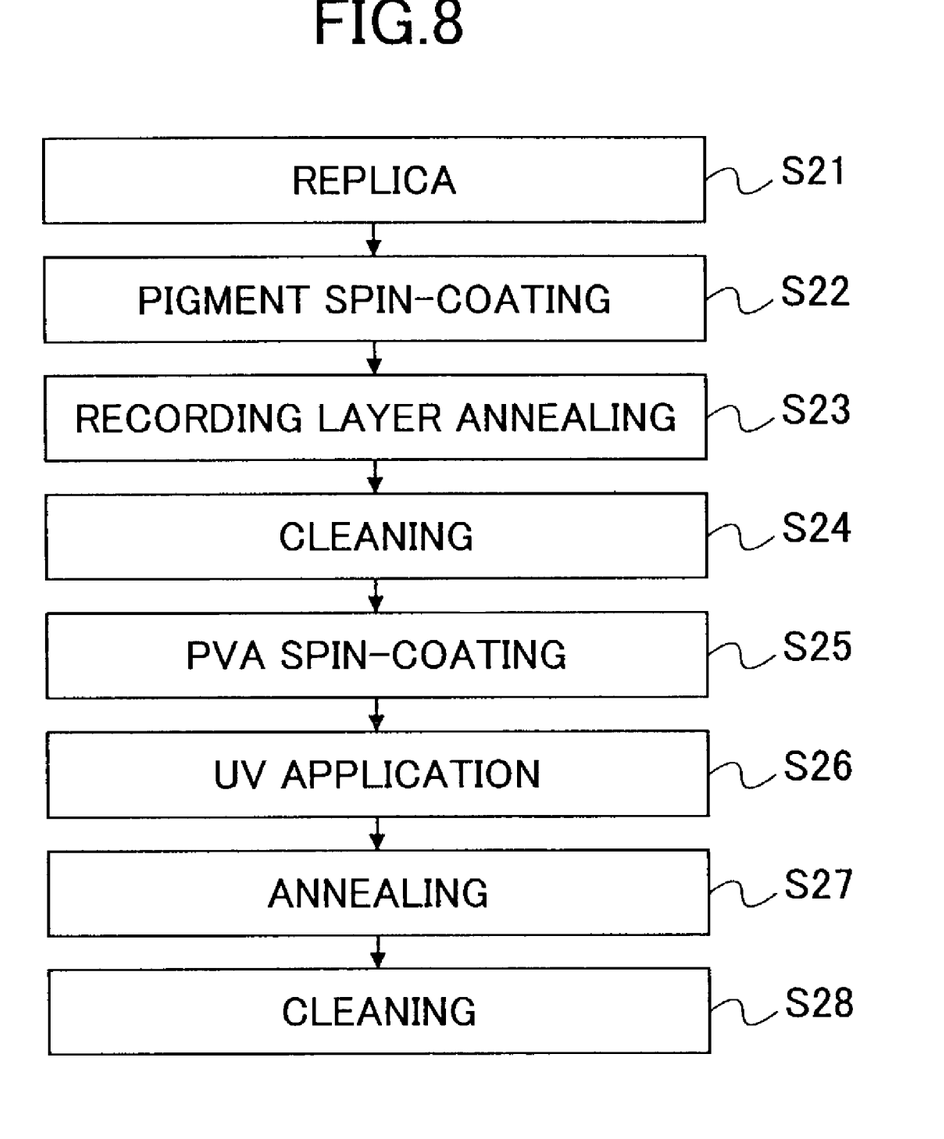
FIG. 8 shows a flow chart of recording layer and protective layer formation process of the method illustrated in FIG. 7.

FIG. 8 shows a flow chart illustrating details of the record layering formation and protective layer formation (S11–S16) in the flow chart of FIG. 7. In a step S21, the substrate (disk) in which the replica layer and the ground layer (which may be omitted), etc. are formed is prepared. Subsequently, an alcoholic solution or cellosolve solution in which phthalocyanine pigment, metal-containing azo dye, cyanine pigment, and infrared absorbing pigment are dissolved is applied by a spin-coating process, and, thus, the recording layer is formed on the substrate in a step S22. Furthermore, in a step S23, the thus-obtained product is made to undergo annealing at the temperature in the range between 30 and 140° C. for ten seconds, and, thus, the excessive solvent is made to be evaporated. In a step S24, the top surface of the thus-obtained pigment thin film is washed. Especially, the surplus perimeter part of the pigment is washed out. In a step S25, a solution of polyvinyl alcohol (PVA) and crosslinking agent is coated on the recording film by a spin-coating process. In a step S26, on the thus-coated film of PVA, an ultraviolet ray is made to be irradiated for 1 second or more, and thus, crosslinking occurs in the PVA. Subsequently, the thus-obtained product is made to undergo annealing for 10 seconds or more at the temperature in the range between 30 and 140° C. after the crosslinking, in a step S27, and thus, the excessive solvent is made to be evaporated. Finally, in order to wash out the excessive crosslinking agent, in a step S28, water etc. is applied onto the crosslinking PVA film by a spin-coating process.

Figure 9:
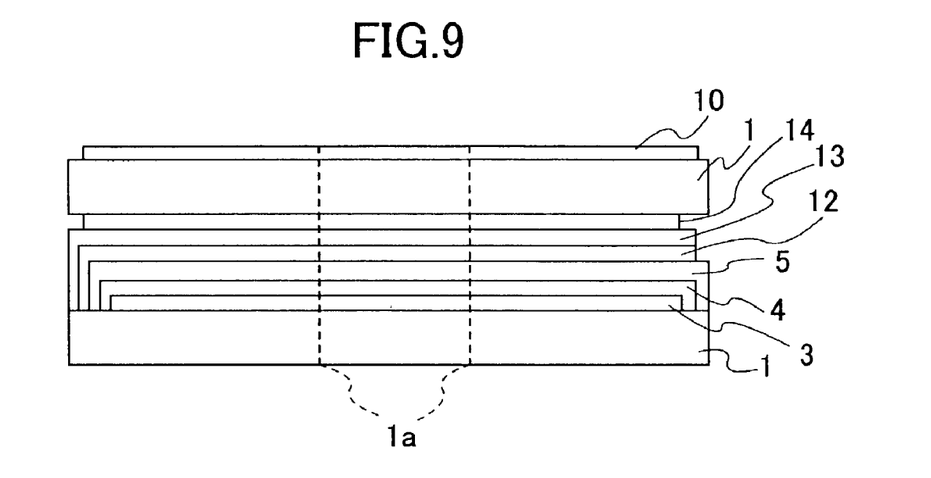
FIG. 9 shows a magnified side-elevational sectional view of an optical information recording medium in a seventh embodiment of the present invention.

A seventh embodiment of the present invention will now be described with reference to FIG. 9. FIG. 9 shows a magnified side-elevational sectional view of an essential part of the optical information recording medium according to the seventh embodiment. As can be seen from the figure, in this optical information recording medium, substrates 1 are stuck together. Specifically, an adhesion layer 12 is laminated onto the protective layer 5 of a laminate of the substrate 1 obtained from any of the above-mentioned embodiments, and then, thereon, the other substrate 1 is stuck via a second intermediate layer 13 and a third intermediate layer 14. An water-soluble resin used in the above-mentioned ground layer/intermediate layer and the metal material used in the above-mentioned metal layer may be used as the second intermediate layer 13 and third intermediate layer 14. Then, same as in the above-mentioned first embodiment, the UV setting ink of the same amount is laminated. The result of experiment on this embodiment is the same as in the first embodiment.

In addition, each of the above-mentioned embodiments is of a disk-type recording medium. However, the present invention may also be applied to an information recording medium in another form, such as a card type one, a stick-type one, a tape-type one, and so forth.

With regard to such a hybrid-type optical disk in a form of a CD-R or CD-RW, having both a ROM area previously having data recorded thereon in mastering and a write-once-type recordable (ROM) area, the following proposals have been made:

As a related art, an optical information recording medium having a pit-part phase difference in the range between 0.3 and 0.5λ and a groove-part phase difference less than 0.3λ is disclose by Japanese patent No. 2596476; an optical information recording medium having a groove-part phase difference in the range between −0.4 and 0.3λ and a groove-interface depth more than 500 Å is disclosed by Japanese patent No. 2135363; and an optical information recording medium having a pit-part phase difference more than 0.125λ (both-way 0.25λ) is disclosed by Japanese laid-open patent applications Nos. 4-146536 and 4-146537.

As disclosed by Japanese patent No. 2083355, the hybrid-type CD-R medium having the ROM area including pits formed by a mastering process on one side thereof, and the recordable area of groove part has a reflective film on a substrate pits in the ROM part same as in an ordinary CD. However, in such a configuration, it is difficult to differently coat pigment at a boundary between the ROM part and groove part, and, also, pigment coating on the inside (in the pits) of the ROM part is further difficult. Accordingly, it is necessary to configure the pit shape and groove shape appropriately such that signal characteristics on the pit part and groove part be satisfactorily those, respectively, while the pigment coating is made on both the pit part and groove part simultaneously.

However, in any configuration, although the characteristic item requirements such as those of modulation, push-pull amplitude (PPA) and so forth prescribed in the Orange book, variation of signals from push-pull/Ig (not-yet recorded part)

and push-pull/Iga (ROM part and already-written part) on a same surface used for tracking servo control of a writer may not fall within 3 dB (approximately 40%) required from the writer. If so, the tracking servo control may fail during recording process, or reproduction process made by the writer. This problem may also occur in an early configuration in which the ROM part and groove part are coated differently.

The following eighth embodiment of the present invention is devised in order to solve this problem, and thus, failure in tracking at a time of reproduction made by the writer can be avoided.

The eighth embodiment has the following features:

(1) In an optical information recording medium having the ROM area having pits formed by a pre-mastering process at a part of a substrate, and the recordable groove area to which data can be written, the optical phase difference (go-and-return) between the pit part and adjacent non-pit part falls within the range between $0.30\lambda$ and $0.45\lambda$ while the optical phase difference (go-and-back) between the groove part and adjacent land part falls within the range between $0.01\lambda$ and $0.10\lambda$. There, $\lambda$ means the wavelength of laser beam used in information recording/reproducing/erasing performed on the relevant recording medium.

(2) An organic pigment layer as a laser beam absorbing layer is formed directly or via another layer on the pits and grooves on the substrate, and, further thereon, a reflective film made of a metal layer is formed directly or via another layer.

(3) A layer made of a phase-change material on which recording is made by refraction change created by laser beam application is formed on the pits and grooves on the substrate directly or via another layer, and, further thereon, a reflective film made of a metal layer is formed directly or via another layer.

(4) The pit width and groove width fall within the range between 0.4 and 0.7 μm in half-band width, and, the optical phase difference between the groove part and adjacent land part corresponding to this range falls within the range defined by such a relationship that, when the half-band width of the pits and grooves is 0.4 μm, the optical phase difference falls within the range between $0.02\lambda$ and $0.10\lambda$; when the half-band width of the pits and grooves is 0.7 μm, the optical phase difference falls within the range between $0.01\lambda$ and $0.07\lambda$. There, $\lambda$ means the wavelength of laser beam used in information recording/reproducing/erasing performed on the relevant recording medium.

As to the above-mentioned feature, item (1), since the push-pull signal on the pit part is fairly smaller than the same on the groove part, PP/Iga of the already written part is quite larger than PP/Iga on the pit part. Moreover, the value of PP/Ig on the not-yet written part is also usually larger than PP/Iga on the pit part although the ratio thereof is smaller than the same in the above-mentioned case of PP/Iga on the write-once part. Generally, a writer performs gain adjustment on a tracking servo signal in the TOC part, when the medium is loaded therein. Therefore, after the gain adjusting in the TOC part at a time of writing operation, the servo gain signal obtained when accessing to the already written part or the not-yet written part becomes larger. A problem may occur on the servo control when it thus becomes larger and exceeds 40%. In order to avoid such a problem, the shapes of the pits and grooves are formed appropriately such that the servo gain signal on each zone fall within the range of ±40% in difference.

Figure 10:
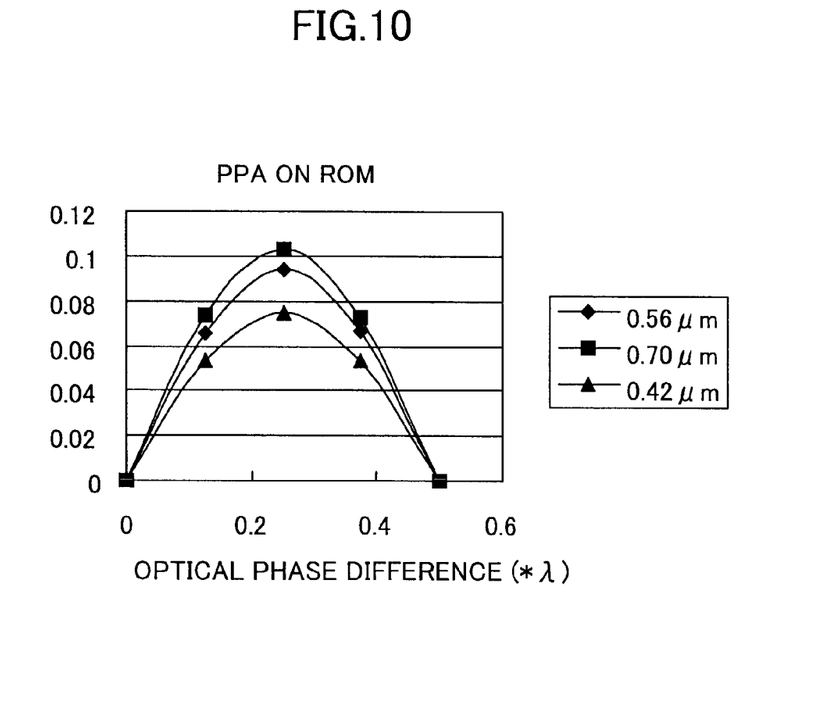
FIG. 10 shows a relationship between an optical phase difference and PPA on a pit (ROM) part in an optical information recording medium in an eighth embodiment of the present invention.
Figure 11:
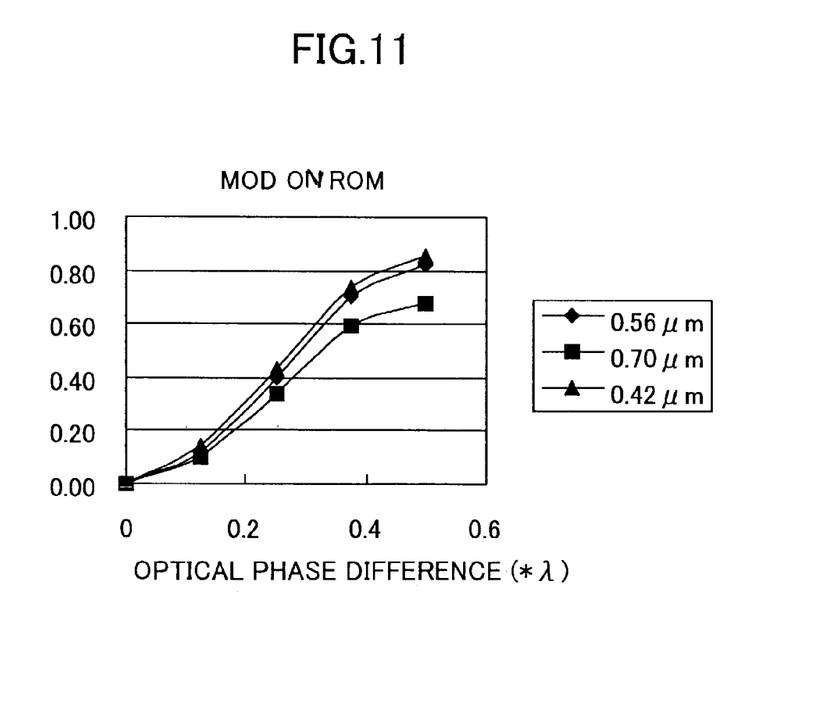
FIG. 11 shows a relationship between the optical phase difference and modulation on the pit (ROM) part in the optical information recording medium in the eighth embodiment of the present invention.
Figure 12:
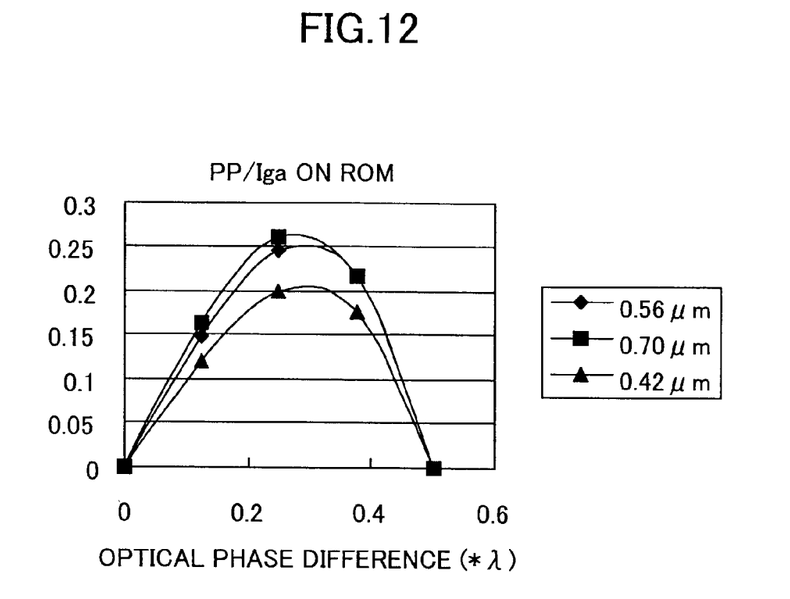
FIG. 12 shows a relationship between the optical phase difference and PP/Iga on the pit (ROM) part in the optical information recording medium in the eighth embodiment of the present invention.
Figure 13:
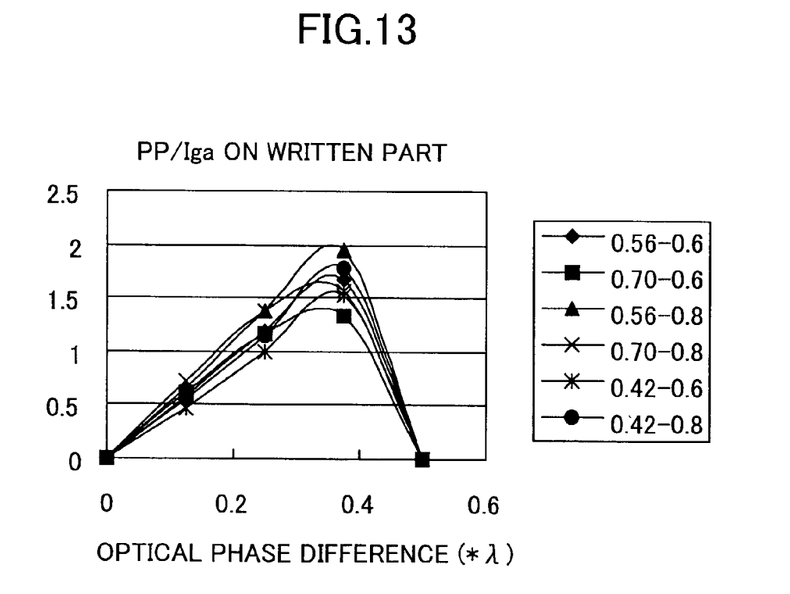
FIG. 13 shows a relationship between the optical phase difference and PPA on the groove part in the optical information recording medium in the eighth embodiment of the present invention.
Figure 14:
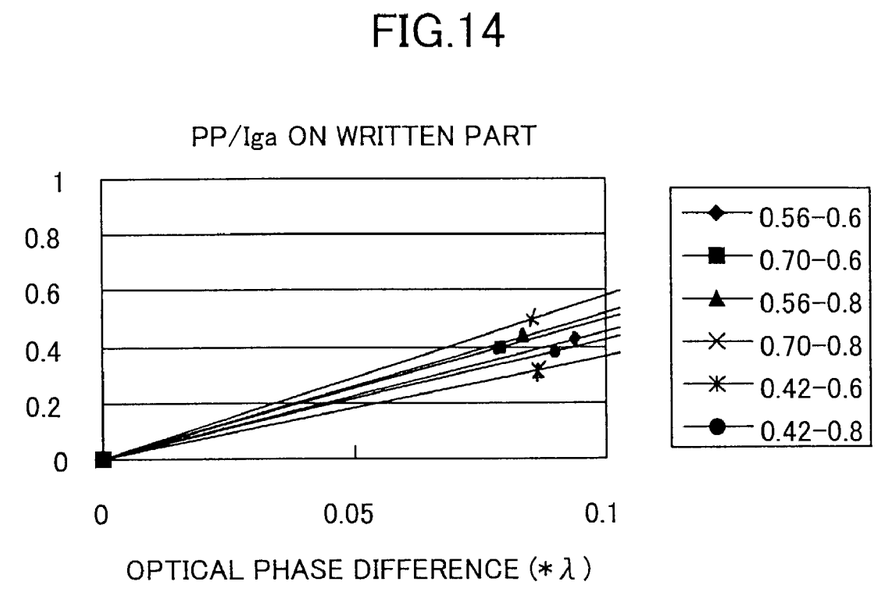
FIG. 14 shows a magnified view of a range less than 0.1λ of FIG. 13.

FIG. 10 shows a relationship of PPA with respect to the optical phase difference on the pit (ROM) part; FIG. 11 shows a relationship of modulation with respect to the optical phase difference on the pit (ROM) part; and FIG. 12 shows a relationship of PP/Iga with respect to the optical phase difference on the pit (ROM) part. In each figure, values shown in the legend are those in half-and width. Similarly, FIG. 13 shows a relationship of PP/Iga with respect to the optical phase difference on the groove part, and FIG. 14 shows a magnified view thereof less than $0.1\lambda$ of the optical phase difference. Further, in FIGS. 13 and 14, the optical phase difference values are those on the already written part in the groove part.

As can be seen from FIGS. 10 and 11, the optical phase difference should fall within the range between 0.3 and $0.45\lambda$ such that PPA and modulation on the pit part satisfy the requirements of the Orange book (0.04 through 0.09; more than 0.6, respectively), and, in this condition, PP/Iga on the pit part falls within the range between 0.08 and 0.25, as can bee seen from FIG. 12. Then, PP/Iga of the already-written part in the groove part should fall within ±40% of this range. In this embodiment, assuming that the performance of the drive applied is a satisfactory one, ±50% thereof (0.04 through 0.375) is determined to be satisfactory. Then, the optical phase difference should fall within the range between $0.01\lambda$ and $0.10\lambda$, corresponding to this range (0.04 through 0.375).

By configuring the pits and grooves to have the optical phase difference according to the above-described requirements, the above-mentioned problem can be solved.

The above-mentioned feature, item (2), is effective to solve the above-mentioned problem in case where the medium applied is a hybrid CD-R. The above-mentioned feature, item (3), is effective to solve the above-mentioned problem in case where the medium applied is a hybrid CD-RW. The above-mentioned feature, item (4), is effective to further positively solve the above-mentioned problem by defining the width of the pits and grooves formed in the disk medium.

Specifically, when the half-band width of the pits and grooves is 0.4 μm, according to FIGS. 10, 11 and 12, PP/Iga on the pit part should fall within the range between 0.15 and 0.21, and, thus, the optical phase difference value should fall within the range between 0.02 and $0.10\lambda$ corresponding to the range of ±50% difference (0.075 through 0.315) of the above-mentioned range of PP/Iga value on the already-written groove part according to FIGS. 13 and 14. Similarly, when the half-band width of the pits and grooves is 0.7 μm, according to FIGS. 10, 11 and 12, PP/Iga on the pit part should fall within the range between 0.1 and 0.23, and, thus, the optical phase difference value should fall within the range between 0.01 and $0.07\lambda$ corresponding to the range of ±50% difference (0.05 through 0.345) of the above-mentioned range of PP/Iga value on the already-written groove part according to FIGS. 13 and 14. Thereby, the above-mentioned problems can be solved more positively.

The eighth embodiment of the present invention will now be described in more detail.

On the surface of a disk made by polycarbonate having the diameter of 120 mm and thickness of 1.2 mm, a TOC part; pits in the range within 35 mm in radius of disk having the depth of 3000 Å, width of 0.7 μm and track pitch of 1.6 μm; and guidance grooves in the range outside thereof of disk having the depth of 1400 Å, width of 0.7 μm and track pitch of 1.6 μm are formed, and, thus, a substrate is obtained. After that, a light absorbing layer made of phthalocyanine pigment is provided thereon through a spin-coating process using a mixture solution of ethylcyclohexane as a coating liquid. After that, heat treatment at 100° C. for 30 minutes is performed thereon, and, then, Ag is provided thereon in a thickness of 1400 Å through a sputtering process, and, thus, a reflective layer is obtained. Thereon, ultraviolet setting resin is applied by a spinner, it is made to set by application of ultraviolet ray, and, thus, approximately 5 μm of protective layer is formed. Then, further thereon, ultraviolet setting ink is applied by a screen-printing method, and, thus, approximately 10 μm of an upper protective layer is formed by applying ultraviolet ray thereon. Thus, a CD-R optical recording medium is obtained.

Then, according to an experiment performed on the above-described configuration of disk medium, this disk medium was loaded in a recording/reproducing apparatus having a pickup of 780 Å, and respective signal values on the pit and groove parts were measured thereby. As a result, the following values were obtained:

Modulation on the pit part; 66%;
PPA thereon: 0.06;
PP/Iga thereon: 0.18;
Modulation on the groove part: 64% (after recording made by the optimum power);
PP/Iga thereon: 0.22.

Thus, the modulation and PPA on the pit and groove parts satisfy the requirements of Orange book, and, also, the ratio of PP/Iga of the tracking servo gain signal on the already-written groove part is 22% up of the ROM part, and, thus, the above-mentioned requirement of ±40% difference in terms of servo characteristics is also satisfied.

Further, the present invention is not limited to the above-described embodiments, and variations and modifications may be made without departing from the scope of the present invention.

The present application is based on Japanese priority applications Nos. 2000-397151, 2001-157431 and 2001-195243, filed on Dec. 27, 2000, May 25, 2001 and Jun. 27, 2001, respectively, the entire contents of which are hereby incorporated by reference.

What is claimed is:

1. An information recording medium comprising:
a transparent substrate; and
a recording layer or a metal layer provided on said transparent substrate directly or via a ground layer,
wherein:
said information recording medium has a RAM area on which information is recorded, reproduced or erased, and a ROM area from which only reproduction is made; and
an average thickness of the recording layer of said RAM area is larger than that of the recording layer or metal layer of the ROM area.

2. The information recording medium as claimed in claim 1, wherein the average thickness of the recording layer is made to have a predetermined value by measuring absorbance of the recording layer or metal layer.

3. The information recording medium as claimed in claim 1, wherein the recording layer is made of a pigment material.

4. The information recording medium as claimed in claim 3, wherein the absorbance of the pigment film on the RAM area is higher than that on the ROM area at a wavelength λmax.

5. The information recording medium as claimed in claim 1, wherein the RAM area and ROM area include the recording layer or metal layer of the same material.

6. The information recording medium as claimed in claim 5, wherein the absorbance on the RAM area is higher than that on the ROM area at a wavelength employed in information recording/reproducing.

7. The information recording medium as claimed in claim 4, wherein the following requirement is satisfied:

$1 \leq ABSram/ABSrom \leq 1.3$ where:
ABSram denotes the absorbance on the RAM area; and
ABSrom denotes the absorbance on the ROM area.

8. The information recording medium as claimed in claim 6, wherein the following requirement is satisfied:

$1 \leq ABSram/ABSrom \leq 1.3$ where:
ABSram denotes the absorbance on the RAM area; and
ABSrom denotes the absorbance on the ROM area.

9. A method of manufacturing an information recording medium comprising the steps of:
a) measuring the absorbance of a recording layer or metal layer with respect to the average thickness thereof; and
b) forming the recording layer or metal layer to have a predetermined average thickness by using the measurement result obtained by said step a).

10. An optical information recording medium comprising:
a ROM area comprising pits formed by pre-mastering at a part of a substrate; and
a recordable groove area on which data is written by laser beam application,
wherein:
an optical phase difference on a go-and-return basis between the pit part and adjacent non-pit part falls within a range between 0.30 λ and 0.45 λ; and
an optical phase difference between the groove part and adjacent land part falls within a range between 0.01 λ and 0.10 λ,
wherein:
a layer made of a phase-change material having information recorded thereon through a refraction change created by laser light application is formed directly or via another layer on the pits and grooves on the substrate; and
a reflective film made of a metal layer is formed thereon directly or via another layer.

11. The optical information recording medium of claim 10, wherein:
the half-band width of the pits and grooves falls within a range between 0.4 μm and 0.7 μm.

12. The information recording medium of claim 11, wherein
the optical phase difference between the groove part and adjacent land part corresponding to said range falls within a range defined by such a relationship that, the optical phase difference falls within a range between 0.02 λ and 0.10 λ when the half-band width of the pits and grooves is approximately 0.4 μm.

13. The information recording medium of claim 11, wherein
the optical phase difference between the groove part and adjacent land part corresponding to said range falls within a range defined by such a relationship that the optical phase difference falls within a range between 0.01 λ and 0.07 λ when the half-band width of the pits and grooves is approximately 0.7 μm.

* * * * *